United States Patent Office 3,552,875
Patented Jan. 5, 1971

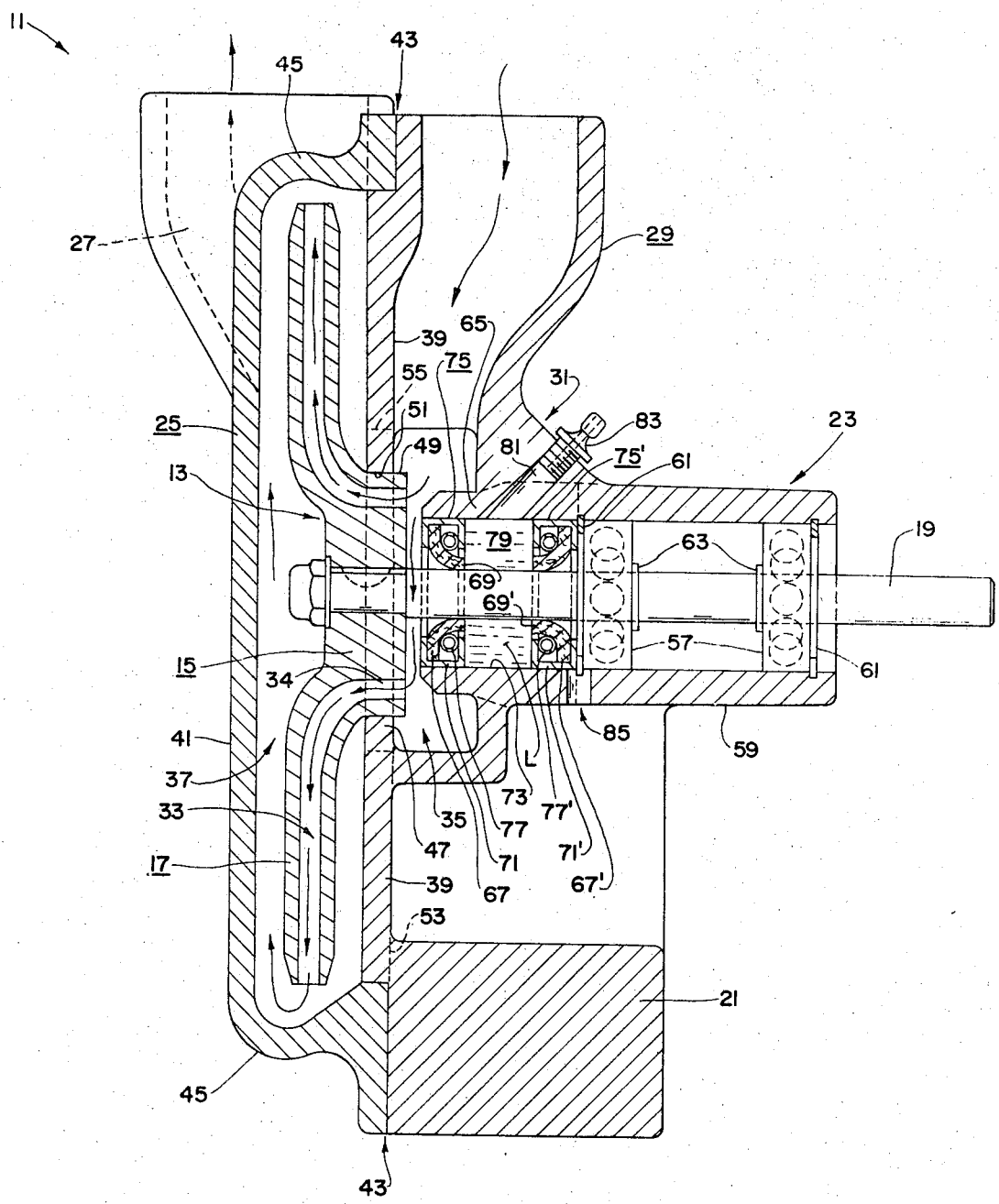

3,552,875
CENTRIFUGAL LIQUID PUMP MEANS
William J. Bond, Jr., Memphis, Tenn., assignor to Ace Pump Corporation, Memphis, Tenn., a corporation of Tennessee
Filed Dec. 20, 1968, Ser. No. 785,500
Int. Cl. F01d *5/08;* F16c *1/24;* B65d *53/00*
U.S. Cl. 415—175
6 Claims

ABSTRACT OF THE DISCLOSURE

Centrifugal liquid pump means particularly including means for sealing the impeller shaft of the pump against air or liquid leakage. The impeller shaft extends through a pair of annular sealing units which in turn are stationarily sealingly secured in the pump housing. The pair of seals each include a semi-resilient seal element having a lip portion runningly circumferentially embracing the impeller shaft. The pair of sealing units are spaced axially wide apart and are arranged with the lip portions thereof confrontingly arranged. The space between the pair of seal units defines a lubricant chamber adapted for containing lubricant for lubricating the running engagement of the sealing lip edges of the sealing units on the impeller shaft.

BACKGROUND OF THE INVENTION (1) Field of the invention

The invention relates to centrifugal pump means generally and particularly relates to means for sealing the pump impeller shaft against air or liquid leakage during operation of the pump means.

(2) Description of the prior art

Generally, prior art practice in the design of impeller shaft sealing means in a centrifugal type pump falls into two broad categories: (a) Pump shaft sealing means as illustrated in Pats. No. 2,276,965 and 2,339,186 which illustrate packing gland type sealing means constrictingly arranged around the pump impeller shaft or pump impeller shaft sleeve; and (b) impeller shaft sealing means as illustrated in Pats. No. 2,798,438 and 2,918,975 which illustrate sealing means having lapped annular face surfaces axially pressed together and sealing along a plane perpendicular to the pump impeller shaft. Generally, the two categories of seal means may be considered as being radially acting and axially acting.

A problem of particular import in the operation of pump shaft sealing means as designed in the abovementioned patents is that problem of maintaining adequate sealing structure when the pump is being utilized for pumping gritty liquids or liquids bearing a substantial quantity of abrasive material. Such material tends to collect or find its way into small crevices in the pump shaft sealing structure and damages the pump shaft or the shaft sealing parts of the pump. This is particularly true for pump shaft sealing means utilizing face-to-face lap joints or such sealing means illustrated in Pats. No. 2,798,438 and 2,918,975. Also, in such pumps utilizing packing gland type sealing means, considerable attention and maintenance is required in maintaining the packing gland nut and packing in proper adjustment (see Pat. No. 2,339,-186).

Another problem of considerable import is in properly lubricating the seal means particularly if the pump shaft is running at high speed. Lubrication of the pump shaft sealing means is particularly important when the pump is running dry and is not pumping liquid. Since the liquid passing through an operating pump serves both to cool and lubricate the pump shaft sealing means, the absence of liquid in the pump often causes the pump seals to become overheated, the impeller shaft to be galled, and such damage as to render ineffective the pump shaft sealing means.

Another undesirable feature of many pumps of prior art design is that feature whereby the pump shaft seal is generally inaccesible to the mechanic or workman and hampers considerably maintenance and repair procedures. Also, the rather complex design and complicated or intricate pump sealing parts are subject to malfunctioning and increase the likelihood of liquid or air leakage at the seal. Moreover, the rather complex design of pump shaft seals in prior art pump structures increase the cost of production and price of the pump unit.

SUMMARY OF THE INVENTION

The mechanical principle and design of the impeller shaft seal means of the present invention is not complicated nor does it include intricate parts to require continuous maintenance or adjustment. The substantially simple design of the shaft sealing means of the invention results in a substantial reduction in the manufacturing cost of a particular pump unit and thus a reduction in the selling price of the unit. The pump shaft seal design of the invention is particularly adapted for handling or pumping gritty liquids or liquids having a substantial content of abrasive material. The pump shaft seal design does not include small crevices or the like subject to trap or hold gritty material against the shaft or revolving parts of the pump; the pump shaft seal design substantially reduces the likelihood of air or liquid leakage around the pump shaft as a result of handling abrasive liquid material. The pump shaft sealing elements of the pump means are continuously bathed by oil or lubricant material; a pair of confrontingly arranged annular sealing elements define in part an oil reservoir or lubricant chamber operative for continuously lubricating the annular sealing elements as the pump is operated.

Another important feature of the invention is that feature whereby an annular sealing element is arranged with a flared annular lip portion sealingly runningly engaging the impeller shaft and with the lip portion projecting in a direction opposite to a negative pressure or suction area of the pump; the suction of the operation pumping unit permits atmospheric pressure in the lubricant chamber to exert a constricting action on the lip portion of an annular seal thereby increasing the effectiveness of the seal. Also, the suction of the operating pump tends to cause a slight amount of lubricant to be drawn or urged along the shaft surface and underneath the shaft-engaging-lip portion of the seal providing thereby effective lubrication of the seal. This feature is particularly important when the pump is being operated dry and the lubricating and heat transfer actions of pumped or flowing liquid is not in effect. The impeller shaft sealing design of the invention permits a pumping unit to be operated dry without incurring the likelihood of damage to the impeller shaft or seal parts of the pumping unit.

BRIEF DESCRIPTION OF THE DRAWINGS

The figure is a vertical plane cross sectional view of a preferred form of the pump means of the invention.

DESCRIPTION OF THE PREFERRED EMBODIMENT

The pump means of the invention, indicated by numeral 11, basically includes an impeller 13 having a hub portion 15 and body portion 17; an impeller shaft 19; base structure or frame structure 21; bearing means 23 journalling shaft 19 on frame structure 21; housing structure 25 enclosing impeller 13 and defining a pump discharge flow outlet passageway 27; intake flow passageway structure 29 arranged on the suction side of the pump means; and sealing means 31 arranged concentrically about shaft 19 for preventing communication of liquid or air between the suction side of the pump and the pump exterior.

Impeller 13 preferably is of the type having a plurality of passages extending radially in body 17. Thus, impeller 13 preferably includes a plurality of separate passageways 33 leading outwardly from an annular suction opening 34 in hub 15 to communicate suction chamber 35 with the outer circumferential space of pressure or impeller chamber 37. Housing structure 25 preferably includes stationary vertical wall structure 39 integrally formed with frame structure 21 and includes a volute configured front part 41 detachably engaged with wall structure 39 along mating surfaces 43; rim portion 45 of impeller housing front 41 is sealingly fastened by suitable means on stationary impeller housing structure 39 for ready access to impeller 13.

Housing structure 25 also preferably includes an annular cuff portion 47 concentrically closely arranged about impeller hub portion 15. The exterior cylindrical surface 49 of impeller hub 15 is runningly fitted about interior cylindrical surface 51 defining a circular opening in cuff structure 47.

For purposes of clarity in description, various parts of the integrally formed structure of pump means 11 have been demarcated by dotted lines; the demarcation of the rigid integrally formed structure of the pump means is intended for more accurately defining the various functions or features of the several parts of the integrally formed pump structure. As an example, the dotted line 53 is intended to indicate a demarcation between frame structure 21 and wall structure 39. In like manner, line 55 is intended to demarcate different structure of integrally formed cuff structure 47 and wall structure 39.

Bearing means 23 preferably includes a pair of radial ball bearing assemblies 57 stationarily journalled in tubular bearing housing structure 59 integrally formed with frame structure 21. Oppositely and opposingly arranged interior and exterior snap rings 63, 61 supported respectively on shaft 19 and bearing housing 59 prevent axial displacement of impeller 13. Suitable drive means (not shown) connect with shaft 19 for the operation of the pump.

Axially elongated generally cylindrical hollow boss structure 65 houses the impeller shaft sealing means 31 of the pump. Boss structure 65 preferably is integrally formed with intake flow passageway structure 29 and impeller shaft bearing housing structure 59. Sealing means 31 is arranged between impeller shaft 19 and boss structure 65 and is operative for restricting passage of liquid or air into or away from suction chamber 35 or the suction side of the pump. Sealing means 31 includes a pair of annular sealing elements 67, 67' coaxially arranged and circumferentially embracing impeller shaft 19. Each sealing element 67, 67' is formed of semi-resilient leather or synthetic rubber material and each includes an annular lip portion 69, 69' constrictingly circumferentially frictionally sealing engaging impeller shaft 19. Retaining means preferably in the form of a pair of annular radially channel-sectioned seal body structures 71, 71' sealingly circumferentially fixedly embrace each sealing element 67, 67' and stationarily sealingly secure the respective sealing elements in cylindrical bore 73 of boss structure 65. Preferably, sealing elements 67, 67' are retained in body elements 71, 71' and form respectively parts of separate sealing units 75, 75'; sealing elements 67 and seal body 71 form sealing unit 75; in like manner, sealing element 67' and seal body 71' form sealing unit 75'. Each sealing unit also preferably includes continuous circular helically wound garter springs 77, 77' circumferentially embracing lip portions 69, 69' respectively of sealing elements 67, 67'. Garter springs 77, 77' constrictingly urge lip portions 69, 69' against shaft 19 for a more effective sealing action. Sealing units 75, 75' are frictionally press-fitted in cylindrical bore 73 of boss structure 65 with sealing element lip portions 69, 69' being in confronting converging relation.

Sealing units 75, 75' are preferably spaced apart a substantial distance axially and define a lubricant chamber 79 adapted for containing a quantity of oil or grease L for lubricating and sealing the engagement of sealing element lip portions 69, 69' with shaft 19. Lubricant feeding means including a feed passageway 81 and an Alemite-type grease fitting 83 provide means for feeding lubricant into chamber 79. It should be pointed out that the placing of sealing elements in the low pressure area of the pump permits use of low pressure rating lip type seals which can be effectively lubricated by inducing a lubricant into the chamber 79.

A weephole 85 is provided in the substructure portion of boss structure 65 and communicates the back side of sealing element 69' with the atmosphere. Weephole 85 provides safety means for indicating pump shaft leakage or liquid leakage past sealing elements 67, 67': Damaged and leaking sealing elements will be indicated by water dripping and passing from weephole 85; the damaged sealing elements may be repaired and without likelihood of damage to bearing assemblies 57, 57 by the leaking liquid.

When pump 11 is in operation, the liquid flow is through intake structure 29 into suction chamber 35; through the hub and body portions of impeller 13 through suction opening 34, passageways 33 and into impeller chamber 37; and through pump discharge flow outlet 27 (see arrow indications in the drawing). The negative pressure or suction pressure induced in suction chamber 35 causes lip portion 69 of sealing element 67 to be drawn constrictingly about the pump impeller shaft and increases the sealing action of the sealing element. Also, the negative pressure in suction chamber 35 has a tendency to conduct a small quantity of lubricant L between sealing element lip portion 69 and the shaft surface toward the suction chamber. The small amount of lubricant moved past seal lip 69 provides anti-friction means or means for lubricating the running engagement of the sealing element lip portion with the impeller shaft. This is possible by the minute clearance between the sealing lips and shaft through which a thin film of lubricant can be induced.

I claim:

1. Centrifugal liquid pump means comprising an impeller having an axially thickened hub portion and an annular body portion arranged about and axially offset relative to said hub portion and with said impeller including structure defining a plurality of passages for conducting liquid axially of said hub toward said impeller body and radially outwardly toward the circumferential periphery of said body, frame structure, an impeller shaft, bearing means journalling said shaft on said frame structure, means concentrically fixedly mounting said impeller on said shaft with said hub portion projecting toward said bearing means, housing structure defining an impeller chamber receiving said impeller body including annular cuff structure concentrically closely arranged about said impeller hub and including structure defining a pump discharge flow outlet, intake flow passageway structure arranged on the suction side of said pump including structure defining a suction chamber arranged generally coaxially with said impeller hub and communicating with said plurality of passages in said hub, axially elongated generally cylindrical boss structure concentrically arranged about said shaft having one end portion thereof intersecting said intake flow passageway structure; and sealing means arranged between said shaft and said boss structure for restricting passage of liquid or air into or away from said suction chamber and the suction side of said pump between said shaft and said boss structure, said sealing means including a pair of annular sealing elements coaxially arranged and circumferentially embracing said impeller shaft, said pair of sealing elements each being formed of semi-resilient material and each including an annular lip portion concentrically circumferentially frictionally sealingly engaging said shaft and including sealing element retaining means sealingly circumferentially fixedly embracing each sealing element and stationarily sealingly securing each sealing element in said boss structure with said pair of sealing element lip portions being in confronting converging relation.

2. The pump means as defined in claim 1 wherein said pair of sealing elements are substantially widely spaced apart defining a lubricant chamber therebetween and includes lubricant feed means for feeding lubricant into said lubricant chamber.

3. The pump means as defined in claim 2 wherein said boss structure defines a cylindrical bore communicating with said suction chamber, and wherein said sealing means is in the form of two sealing units with each unit including an annular sealing element having a lip portion engaging said shaft and an annular radially channel-sectioned rigid seal body retaining means sealingly stationarily securing said sealing element in said cylindrical bore of said boss structure and wherein said lubricant chamber is bounded by said two sealing units, said shaft and the cylindrical interior surface of said bore.

4. The pump means as defined in claim 3 wherein each sealing unit of said two sealing units includes a continuous circular helical garter spring circumferentially embracing the lip portion of said sealing element and constrictingly urging said lip portion against said impeller shaft.

5. Centrifugal liquid pump means comprising a drive shaft, an impeller mounted on said drive shaft, said impeller having a suction opening and passageways communicating with said suction opening; housing means defining a pressure chamber, defining a suction chamber, and defining a cylindrical bore communicating with said suction chamber adjacent one end and communicating adjacent the opposite end with the ambient air outside the pump means; bearing means rotatably mounting said drive shaft in said bore and said impeller being arranged with said suction opening in communication with said suction chamber and said passageways in communication with said pressure chamber, sealing means arranged concentrically about said shaft in said bore for preventing communication of liquid or air through said bore between said suction chamber and the pump means exterior; said sealing means comprising a pair of annular sealing means spaced apart in fixed relationship along said shaft and defining a lubricant chamber therebetween with one of said annular sealing means being exposed to said suction chamber on the opposite side of said one of said annular sealing means from said lubricant chamber, and means for introducing lubricant into said lubricant chamber.

6. Centrifugal liquid pump means comprising a drive shaft; housing means defining a pressure chamber, defining a suction chamber, and defining a cylindrical bore communicating with said suction chamber adjacent one end and communicating adjacent the opposite end with the ambient air outside the pump means; bearing means rotatably mounting said drive shaft in said bore, sealing means arranged concentrically about said shaft in said bore for preventing communication of liquid or air through said bore between said suction chamber and the pump means exterior, said sealing means comprising a pair of annular sealing means spaced apart along said shaft and defining a lubricant chamber therebetween with one of said annular sealing means being exposed to said suction chamber on the opposite side of said one of said annular sealing means from said lubricant chamber, means for introducing lubricant into said lubricant chamber, and impeller means mounted on said drive shaft and interposed between said suction chamber and said pressure chamber for pumping liquid therebetween and for causing a suction in said suction chamber sufficient to draw slight amounts of lubricant from said lubricant chamber past said one of said annular sealing means to said suction chamber for the lubrication of said one of said annular sealing means.

References Cited
UNITED STATES PATENTS 2,436,514  2/1948  Jennings _____ 415—175

FOREIGN PATENTS 965,032  2/1950  France _____ 415—175

HENRY F. RADUAZO, Primary Examiner

U.S. Cl. X.R.

277—59; 308—187